United States Patent
Shinohara

(10) Patent No.: US 8,053,028 B2
(45) Date of Patent: Nov. 8, 2011

(54) CONDUCTIVE POLYMER FILM AND POLARIZING PLATE USING THE SAME

(75) Inventor: Hironobu Shinohara, Tokyo (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 589 days.

(21) Appl. No.: 11/682,188

(22) Filed: Mar. 5, 2007

(65) Prior Publication Data

US 2007/0172587 A1    Jul. 26, 2007

Related U.S. Application Data

(63) Continuation of application No. 10/645,533, filed on Aug. 22, 2003, now abandoned.

(51) Int. Cl.
*B05D 5/12* (2006.01)

(52) U.S. Cl. ............ 427/108; 427/163.1; 427/164; 427/384; 427/385.5; 427/393.5

(58) Field of Classification Search ............ None
See application file for complete search history.

(56) References Cited

U.S. PATENT DOCUMENTS

| | | | |
|---|---|---|---|
| 4,674,840 A | 6/1987 | Bennett | |
| 5,300,575 A | 4/1994 | Jonas et al. | |
| 5,334,424 A | 8/1994 | Hani et al. | |
| 6,191,837 B1 | 2/2001 | Fujimaki et al. | |
| 6,203,727 B1 | 3/2001 | Babinec et al. | |
| 6,248,818 B1 | 6/2001 | Kim et al. | |
| 6,333,145 B1 * | 12/2001 | Cloots et al. | 430/529 |
| 7,214,405 B2 * | 5/2007 | Tahon et al. | 427/162 |

FOREIGN PATENT DOCUMENTS

| | | | |
|---|---|---|---|
| JP | 5-097978 A | | 4/1993 |
| JP | 06-51117 | * | 2/1994 |
| JP | 60-51117 A | | 2/1994 |
| JP | 6-157788 A | | 6/1994 |
| JP | 7-90060 A | | 4/1995 |
| JP | 8095016 A | | 4/1996 |
| JP | 10-278160 | | 10/1998 |
| JP | 2000-306435 | | 11/2000 |

OTHER PUBLICATIONS

Korean Office Action issued Sep. 30, 2009 in corresponding Korean Patent Application No. 10-2003-0058220.
Korean Office Action dated Mar. 30, 2010, issued in corresponding Korean Patent Application No. 10-2003-0058220.
Korean Office Action dated Jul. 29, 2011 issued in corresponding Korean Patent Application No. 10-2011-0041592. English translation.
Korean Office Action dated Jul. 29, 2011 issued in corresponding Korean Patent Application No. 10-2011-0041594. English translation.

* cited by examiner

*Primary Examiner* — Erma Cameron
(74) *Attorney, Agent, or Firm* — Westerman, Hattori, Daniels & Adrian, LLP

(57) ABSTRACT

A conductive polymer film having an antistatic function and an electromagnetic wave shielding function, and also having excellent optical properties such as transparency even if the film is arranged in the interior of LCD. The conductive polymer film comprises a polymer film and a conductive polymer adhered to the surface thereof, wherein the conductive polymer comprises polythiophene or polythiophene derivatives, the polymer film comprises an acetyl cellulose material or a norbornene material, a layer of the conductive polymer has a thickness of 3 µm or less, and the conductive polymer film has a visible light transmission of 78% or more and a surface resistivity of $10^3$-$10^{12}$ Ω/square.

7 Claims, No Drawings

CONDUCTIVE POLYMER FILM AND POLARIZING PLATE USING THE SAME

CROSS-REFERENCE TO RELATED APPLICATIONS

This application is a continuation of U.S. application Ser. No. 10/645,533 filed Aug. 22, 2003, now abandoned.

FIELD OF THE INVENTION

The present invention relates to a method of producing a protective film for a polarizing plate comprising a polymer film and a conductive polymer layer adhered to the surface thereof. The protective film comprises an acetyl cellulose material or a norhornene material, and a layer of the conductive polymer having a thickness of 3 µm or less. The protective film has a visible light transmission of 78% or more and a surface resistivity of $10^3$-$10^{12}$ Ω/square. The protective film has high transparency, and antistatic function or electromagnetic wave shielding function, and is used in a display such as a liquid crystal display (LCD). In particular, the protective film is advantageously used as a protective film for a polarizing plate.

DESCRIPTION OF THE RELATED ART

Polarizing plates have a structure such that a polyvinyl alcohol (PVC) film is stretched, iodine or a dye is adhered and fixed to the stretched film to prepare a polarizing film, and a film comprising triacetyl cellulose (TAC) is adhered to both side of the polarizing film, thereby reinforcing strength of PVA film and preventing change in properties of PVA film due to water absorption. TAC has excellent transparency and small birefringence, and easily adheres to PVA. For this reason, TAC film has been used as a protective film for a polarizing film.

In recent years, with increasing a size of liquid crystal displays, there is the case that a degree of dimensional change due to water absorption may become problem even in TAC. For this reason, it is investigated to use a norbornene material having excellent transparency, small birefringence and small water absorption as a substitute of TAC.

On the other hand, in displays, such as CRT, EL or PDP, including LCD, electromagnetic waves emitted from such displays adversely affect human body. Therefore, it has been required to shield the electromagnetic waves. Further, where a film having such an electromagnetic wave shielding function is provided in the interior or to the exterior of displays, the film is required to have excellent transparency, small birefringence, high strength, high heat resistance and low water absorption. Thus, it has been required to find a film having an electromagnetic wave shielding function in addition to the above-described properties.

Electromagnetic waves can be shielded by providing a material having conductivity imparted thereto on the front of displays. In general, a product obtained by adhering ITO or the like to a polymer film by a method such as sputtering or deposition is used as a high-transparent, conductive material. However, those methods have poor productivity, and the material itself is expensive, leading to the problem that a film having a conductivity imparted thereto is very expensive. Further, ITO tends to color in yellow. With the progress of color LCD, this coloration becomes problem.

Where a material having conductivity imparted thereto is provided on displays such as LCD, EL or PDP, adhesion of dusts on such a material due to static electricity is a great problem. Therefore, it has been desired to further have an antistatic function.

Conventional conductive polymer materials are polyaniline derivatives, polypyrrole derivatives and polythiophene derivatives. If it is tried to obtain high resistance in such derivatives, there has been the problem that polyanilines color in green and polypyrroles color in gray.

SUMMARY OF THE INVENTION

The present invention has been made in view of the above-described problems.

Accordingly, an object of the prevent invention is to provide an inexpensive, conductive film which overcomes the problems in the prior art, does not have any problem in transparency even if provided on displays such as LCD, and has antistatic function and electromagnetic wave shielding function.

The present invention provides a method of producing a protective film for a polarizing plate comprising a polymer film and a conductive polymer layer adhered to the surface thereof: comprising a step of: forming the conductive polymer layer with an aqueous coating liquid on the surface of the polymer film, wherein the polymer film comprises an acetyl cellulose material, the conductive polymer layer has a thickness of 3 µm or less, the aqueous coating liquid contains polythiophene or polythiophene derivatives as a conductive polymer, and the protective film has a visible light transmission of 78% or more and surface resistivity of $10^3$-$10^{12}$ Ω/square. The object of the present invention can be achieved by using a polythiophene material as the conductive polymer, controlling the thickness of a layer of the conductive polymer to 3 µm or less, and using a acetyl cellulose material or a norbornene material as a polymer film material.

DETAILED DESCRIPTION OF THE INVENTION

The present invention is described in detail below.

The conductive polymer used in the present invention is a homopolymer or a copolymer obtained by polymerizing thiophene and/or thiophene derivatives. The conductive polymer is a homopolymer or a copolymer, comprising at least one of units represented by the following formulae (I), (II), (III) and (VI) as polymerization units. The conductive polymer may be a copolymer containing a small amount of polymerization units other than the above-described polymerization units, as a copolymerizable unit.

(I)

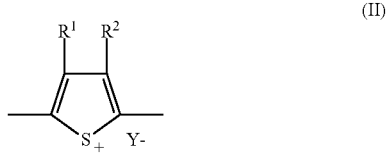

(II)

-continued

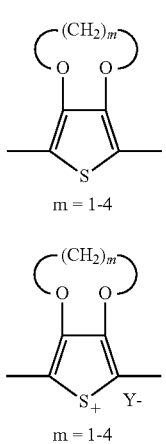

In the formulae (I) and (II), $R^1$ and $R^2$ each represent hydrogen atom, an aliphatic hydrocarbon group having 20 or less carbon atoms, an alicyclic hydrocarbon group having 20 or less carbon atoms, an aromatic hydrocarbon group having 20 or less carbon atoms, hydroxyl group, a group having terminal hydroxyl group, alkoxyl group, a group having terminal alkoxyl group, carboxyl group, a group having terminal carboxyl group, carboxylate group, a group having terminal carboxylate group, an ester group, a group having terminal ester group, sulfonic group, a group having terminal sulfonic group, sulfonyl group, a group having terminal sulfonyl group, sulfinyl group, a group having terminal sulfinyl group, acyl group, a group having terminal acyl group, amino group, a group having terminal amino group, a group having amino group in which part or whole of hydrogen atoms are substituted, a group having terminal amino group in which part or whole of hydrogen atoms are substituted, a group having terminal carbamoyl group, a group having carbmoyl group in which part or whole of hydrogen atoms are substituted, a group having terminal carbmoyl group in which part or whole of hydrogen atoms are substituted, halogen atom, phosphate group, a group having terminal phosphate group, oxirane group, or a group having terminal oxirane group.

In the formulae (II) and (VI), $Y^-$ represents an anion. Examples of the anion include halogen ions, sulfonic acid ions and carboxylic acid ions.

To further increase conductivity, a dopant can be added to a conductive polymer of such thiophenes in an amount of, for example, 0.1-500 parts by weight per 100 parts by weight of the conductive polymer. Examples of the dopant include LiCl, $R^3$COOLi ($R^3$: saturated hydrocarbon group having 1-30 carbon atoms; hereinafter the same), $R^3SO_3Li$, $R^3COONa$, $R^3SO_3Na$, $R^3COOK$, $R^3SO_3K$, tetraethylammonium, $I_2$, $BF_3Na$, $BF_4Na$, $HClO_4$, $CF_3SO_3H$, $FeCl_3$, tetracyanoquinoline, $Na_2B_{10}Cl_{10}$, phthalocyanine, porphyrin, glutamic acid, alkylsulfonate, polystyrenesulfonic acid alkali salt copolymer, polystyrenesulfonic acid anion, styrenesulfonic acid, and styrenesulfonic acid anion copolymer. Those can be used alone or as mixtures of two or more thereof.

A binder resin can be compounded with the conductive polymer in order to further improve adhesiveness between the polymer film and the conductive polymer. The binder resin cannot particularly be limited and can appropriately be selected so long as it has excellent adhesiveness to the kind of polymer films. Examples of the binder resin used include polyester resins, acrylic resins, acryl-modified polyester resins, urethane resins, vinyl acetates, vinyl chlorides, polyvinyl alcohols, polyethylene vinyl acetate and organic silicates. Those binder resins can be used alone or as mixtures of two or more thereof.

The conductive polymer layer in the present invention is a coating having a surface resistivity of $10^3$-$10^{12}$ Ω/square obtained by applying an aqueous coating liquid containing a conductive polymer obtained by polymerizing thiophene and/or thiophene derivatives, to a polymer film, drying and curing the coating layer. The surface resistivity is preferably $10^4$-$10^8$ Ω/square. If the surface resistivity is less than $10^3$ Ω/square, it is necessary to increase the thickness of the coating, or the amount of the binder becomes insufficient, and as a result, the coating becomes brittle. On the other hand, if the surface resistivity exceeds $10^{12}$ Ω/square, antistatic effect or electromagnetic wave shielding effect becomes insufficient.

The conductive polymer layer formed by a coating method is preferably prepared by coating a polymer film with an aqueous solution containing a composition comprising 1-95% by weight, preferably 2-70% by weight, of a conductive polymer, and 5-99% by weight, preferably 30-98% by weight, of a binder resin, and drying and curing the coating.

Where the proportion of the conductive polymer and the binder resin is within the above-described range, adhesiveness is good between the polymer film and the conductive polymer, and as a result, antistatic effect is excellent, and adhesiveness and abrasion resistance are improved.

The composition comprising the conductive polymer and the binder resin can generally be obtained by the conventional mixing method. A method of covering the surface of a fine granular binder resin with the conductive polymer or a method of chemically bonding functional groups on the conductive polymer and functional groups on the binder resin can also be used.

For the purpose of adjusting adhesiveness, solvent resistance, water resistance and the like, epoxy resins, vinyl resins, polyether resins, water-soluble resins or the like can optionally be added as a component of the conductive polymer layer. In addition, to improve a sliding property, blocking resistance or the like of the coating, inorganic or organic fine particles having an average particle diameter of about 0.01-20 μm can also be contained in an amount of 0.001-5% by weight as a lubricant.

Examples of such fine particles include inorganic fine particles such as silica, alumina, titanium oxide, carbon black, kaolin or calcium carbonate, and organic fine particles such as polystyrene resin, crosslinked polystyrene resin, acrylic resin, crosslinked acrylic resin, melamine resin, silicone resin, fluorine resin, urea resin or benzoguanamine resin. Those organic fine particles can be thermoplastic resins or thermosetting resins so long as it is a resin which can maintain the fine particle state in the coating to a certain extent. Conductive fillers such as tin oxide file particles or indium oxide fine particles can also be added to the conductive polymer layer to improve conductivity thereof.

If required and necessary, surfactants, antioxidants, colorants, pigments, fluorescent brighteners, plasticizers, crosslinking agents, organic lubricants, ultraviolet absorbers, antistatic agents or the like can be added, other than the above-described fine particles.

The conductive polymer layer is formed by using an aqueous coating liquid containing the conductive polymer, and if necessary, binders, dopants and other additives. The solid concentration of the aqueous coating liquid is generally 0.1-30% by weight, preferably 1-20% by weight. Where the solid concentration is within this range, the viscosity of the aqueous coating liquid is suitable for coating. The aqueous coating liquid can be used in any form of an aqueous solution, an aqueous dispersion, an emulsion or the like. Volatilization rate of a solvent can be increased by adding water-soluble solvents such as alcohols (e.g., methanol, ethanol, isopropyl alcohol or ethylene glycol), or ketones (e.g., acetone or methyl ethyl ketone) to the aqueous coating liquid. In particular, alcohols are preferably used from the points that the alcohols have high miscibility with water and also improve lubricating property. Other solvents may be contained in the aqueous coating liquid in an amount that does not adversely affect.

It is also possible to proceed the polymerization by applying an oxidizing agent to a substrate surface on which the conductive polymer layer is formed, at a coating level of several μm, and contacting monomers with the coating of the oxidizing agent in a gaseous state, thereby forming a conductive polymer layer on the substrate.

In the present invention, the conductive polymer layer is formed by applying the above coating liquid to a transparent polymer film. The polymer film having the conductive polymer layer adhered thereto (i.e., conductive polymer film) is used as an optical film, particularly as a protective film of a polarizing plate. Therefore, a visible light transmission and a birefringence are important properties for the conductive polymer film used. The higher the visible light transmission, the better. The visible light transmission is generally 78% or higher, preferably 82% or higher, more preferably 85% or higher. The smaller the birefringence, the better. The birefringence is generally 100 nm or less, preferably 50 nm or less. Conductive polymer films having those properties together are preferably used.

Acetyl cellulose films and norbornene films are used as such a polymer film from properties of a visible light transmission, birefringence and yellow coloration.

Examples of acetyl cellulose film include a triacetyl cellulose film (TAC film) or cellulose diacetate film using cellulose fibers as a raw material, and modified films of those. Those films are generally obtained by, for example, dissolving cellulose fibers in an appropriate solvent such as methylene chloride, applying the resulting solution to a stainless steel belt or an appropriate polymer film, removing the solvent, and drying the film.

The norbornene film suitably used in the present invention is not particularly limited so long as it is a polymer obtained from at least one kind of monomers having a norbornene structure. For example, the polymer can be obtained by a method of ring opening-polymerizing monomers having a norbornene structure, and hydrogenating part or whole of residual double bonds in the presence of a hydrogenation catalyst. Specific examples of the polymer include ZEONEX or ZEONOR (trade name, manufactured by Nippon Zeon Co., Ltd.) produced by the method described in, for example, JP-A 63-218726, 5-25220 or 9-183832; and ARTON (trade name, manufactured by JSR Corporation) produced by the method described in, for example, JP-A 5-97978 or 1-240517.

Further example of the polymer is a polymer obtained by addition polymerization of monomers comprising a monomer having a norbornene structure and a plurality of other monomers having double bonds, in the conventional manner. Examples of such a polymer include APEL (trade name, manufactured by Mitsui Chemical Co., Ltd.) and TOPAS (trade name, manufactured by Hoechst AG) produced by the method described in, for example, JP-A 6-107735, 62-252406 or 8-259629.

The method of producing a film from the thus obtained polymer can be the conventional method. For example, the film can be produced by a casting method comprising dissolving a polymer in a solvent that can well dissolve the polymer, specifically halogen solvent such as methylene chloride, or aromatic or alicyclic solvent, applying the resulting polymer solution to a belt made of a metal such as a stainless steel, or a polymer film such as polyester, and removing the solvent, followed by drying. The film can also be produced by an extrusion method comprising melting a polymer by heating, extruding the molten polymer on a metal belt, and cooling the same.

In producing the acetyl cellulose film or norbornene film, various additives such as antioxidants, ultraviolet absorbers, ultraviolet stabilizers, colorants, lubricants, antistatic agents, pigments, dyes, fibers or dispersants can be added to the polymer, if required and necessary. Where the film is used as a protective film of a polarizing plate, a film containing antioxidants, ultraviolet absorbers and/or ultraviolet stabilizers is preferably used.

The surface of the film thus obtained may be coated with an appropriate material for various purposes. For example, acrylic, urethane or urethane acrylic UV curable or thermosetting hardcoat materials, epoxy hardcoat materials, silicone hardcoat materials, or the like can be applied to the surface of the film to prevent the surface from scratches. Films obtained by applying those hardcoat materials containing fine particles such as $SiO_2$ or alumina to the surface thereof, thereby reducing glare, i.e., films having antiglared hardcoat, can also be used. Where a film is used as a protective film of a polarizing plate, a film having the above hardcoat or aniglared hard coat is further preferably used.

The method of applying a coating liquid to the polymer film can use the conventional coating method. Examples of the method include roll coating, gravure coating, screen printing, off-set printing, microgravure coating, reverse coating, roll brushing, spray coating, air knife coating, impregnating and curtain coating. Those methods can be used alone or in combination of two or more thereof.

The conductive polymer layer has a thickness of 0.005-3 μm, preferably 0.01-1 μm, more preferably 0.02-0.5 μm. If the thickness is too small, a sufficient antistatic effect may not be obtained. On the other hand, if the thickness is too large, the coating film may crack or anti-blocking property may deteriorate. The conductive polymer layer can be formed on one side or both sides of the polymer film.

The above-described hardcoat material or antiglared hardcoat can be applied to the thus obtained polymer film having the conductive polymer layer formed thereon. Further, various conventional coats such as antirefrective coat, antistaining coat or pressure-sensitive adhesive coat can also be applied depending on the desired purpose. Where the conductive polymer layer is formed on one side of the film, hardcoat, antiglared hardcoat, antirefrective coat, antistaining coat or pressure-sensitive adhesive coat can be applied to the opposite side, depending on the purpose. Those coats can be used alone or in combination of two or more, depending on the purpose.

Two polarizing plates are generally arranged before and after the liquid crystal in LCD. The film according to the present invention can be used as four protective films for two polarizing plates. However, it is not always necessary to use four films, and one, two or three films can be used as a protective film, depending on the purpose. Where a plurality of films are used, it is not necessary for those films to have the same resistivity, and the type of the polymer film can appropriately be selected depending on the purpose. Considering the electromagnetic wave shielding function, the film is preferably used as an outermost protective film from the standpoints of effect and cost.

The present invention is described in more detail by reference to the following Examples, but it should be understood that the invention is not construed as being limited thereto.

EXAMPLE 1

20 g of a conductive polymer obtained by doping 16 parts by weight of diooxyethylene polythiophene (Baytron PH, manufactured by Bayer) with 30 parts by weight of a material obtained by copolymerizing polystyrenesulfonic acid ion and polystyrenesulfonic acid in 1:1 molar ratio, 100 g of a binder obtained by mixing acrylic resin, urethane resin and polyvinyl alcohol in 1:1:1 in weight ratio, and 5 g of polyoxyethylene nonylphenyl ether as a nonionic surfactant were dissolved in 1 kg of water containing 20 wt % of isopropyl alcohol to obtain aqueous coating liquid 1. This coating liquid was applied to a triacetyl cellulose film (TAC film) having a thickness of 80 μm by a gravure coater, and dried at 100° C. The resulting conductive polymer film had a thickness of 0.11 μm. Properties of this film are shown in Table 1 below.

Comparing with Comparative Example 1 described hereinafter wherein the conductive polymer solution was not applied, it is apparent that although the surface resistivity higher than $10^{14}$ Ω/square decreases to $8\times10^5$ Ω/square by the application, and thus conductivity increases, total solar energy transmission and birefringence do not substantially deteriorate, and the yellowness reversely decreases. This shows that even if the film is arranged in the interior of LCD, in particular even if used as a protective film of a polarizing plate, the film does not adversely affect optical properties, the yellowness is rather improved, and thus, an electromagnetic wave shielding function or an antistatic function can be added.

COMPARATIVE EXAMPLE 1

Properties of TAC film used in Example 1, to which the conductive polymer liquid was not applied, were measured. The results obtained are shown in Table 1 below.

EXAMPLE 2

Antiglare-treated film was prepared by applying an ultraviolet curable acrylic hardcoat material having fine silica dispersed therein to TAC film having a thickness of 80 μm such that the film has Haze value of 27.1% and a luster at an angle of 60° of 34.3%. The aqueous coating liquid 1 as obtained in Example 1 was applied to the surface of the film obtained above in the same manner as in Example 1. The resulting conductive polymer layer had a thickness of 0.12 μm. Properties of this film are shown in Table 2 below.

Comparative Example 2 described hereinafter shows the characteristic values in the case where the conductive polymer solution was not applied. Comparing with Comparative Example 2, it is apparent that although the surface resistivity higher than $10^{14}$ Ω/square decreases to $7\times10^5$ Ω/square by the application, and thus conductivity increases, total solar energy transmission and birefringence do not substantially change, and the yellowness is rather improved. It is further apparent that even though the conductive polymer solution is applied to the antiglare-treated layer, Haze value and luster do not substantially change. It can be understood from the results that even though an antiglare-treated TAC film having the conductive polymer of the present invention applied thereto is arranged in the interior of LCD, the antiglare treatment effect can be maintained, optical properties are not adversely affected, electromagnetic wave shielding function and static prevention function can be imparted, and yellowness is reversely improved.

COMPARATIVE EXAMPLE 2

Properties of the antiglare-treated TAC film as used in Example 2, to which the conductive polymer solution was not applied, were measured. The results obtained are shown in Table 2 below.

EXAMPLE 3

A coated film was obtained in the same manner as in Example 1 except that the amount of the conductive polymer used was changed to 10 g. The resulting conductive polymer layer had a thickness of 0.12 μm. Properties of this film are shown in Table 1 below.

EXAMPLE 4

A coated film was obtained in the same manner as in Example 1 except that the thickness of the conductive polymer layer was changed to 1.2 μm. Properties of this film are shown in Table 1 below.

EXAMPLE 5

The same aqueous coating liquid 1 as used in Example 1 was applied to a film having a thickness of 100 μm, made of norbornene material (trade name "ARTON", manufactured by JSR Corporation). The resulting conductive polymer layer had a thickness of 0.10 μm. Properties of this film are shown in Table 1 below.

COMPARATIVE EXAMPLE 3

Properties of the film as used in Example 5, to which the aqueous coating liquid was not applied, were measured. The results obtained are shown in Table 1 below.

EXAMPLE 6

The aqueous coating liquid was applied in the same manner as in Example 5 except that the film was changed to an antiglare-treated ARTON film having a thickness of 100 μm. The resulting conductive polymer has a thickness of 0.11 μm. Properties of this film are shown in Table 2 below.

COMPARATIVE EXAMPLE 4

Properties of the film as used in Example 6, to which the aqueous coating liquid was not applied, were measured. The results obtained are shown in Table 2 below.

EXAMPLE 7

A coated film was obtained in the same manner as in Example 6 except that the film was changed to a film having a thickness of 100 μm, made of a norbornene material (trade name "ZEONOA", manufactured by Nippon Zeon Co., Ltd.) and which was antiglare-treated in the same manner as in Example 6. The resulting conductive polymer layer had a thickness of 0.12 μm. Properties of this film are shown in Table 2 below.

COMPARATIVE EXAMPLE 5

Properties of the film as used in Example 7, to which the aqueous coating liquid was not applied, were measured. The results obtained are shown in Table 2 below.

TABLE 1

|  | Example 1 | Example 3 | Example 4 | Comparative Example 1 | Example 5 | Comparative Example 3 |
|---|---|---|---|---|---|---|
| Film | TAC | TAC | TAC | TAC | ARTON | ARTON |
| Conductive polymer layer thickness (μm) | 0.11 | 0.12 | 1.2 | None | 0.10 | None |
| Surface resistivity (Ω/square) | $8 \times 10^5$ | $4 \times 10^9$ | $6 \times 10^4$ | $>10^{14}$ | $2 \times 10^6$ | $>10^{14}$ |
| Yellowness b* | 0.25 | 0.35 | 0.17 | 0.40 | 0.30 | 0.45 |
| Total solar energy transmission (%) | 92.1 | 92.3 | 90.0 | 92.3 | 92.7 | 92.6 |
| Birefringence (nm) | 10 | 10 | 12 | 10 | 15 | 16 |

TABLE 2

|  | Example 2 | Comparative Example 2 | Example 6 | Comparative Example 4 | Example 7 | Comparative Example 5 |
|---|---|---|---|---|---|---|
| Film | TAC | TAC | ARTON | ARTON | ZENOR | ZENOR |
| Conductive polymer layer thickness (μm) | 0.12 | None | 0.11 | None | 0.12 | None |
| Surface resistivity (Ω/square) | $7 \times 10^5$ | $>10^{14}$ | $7 \times 10^5$ | $>10^{14}$ | $6 \times 10^5$ | $>10^{14}$ |
| Yellowness b* | 0.50 | 0.65 | 0.55 | 0.71 | 0.77 | 0.93 |
| Total solar energy transmission (%) | 91.3 | 91.4 | 92.0 | 92.2 | 91.5 | 91.9 |
| Birefringence (nm) | 11 | 12 | 16 | 17 | 17 | 19 |
| Haze (%) | 25.9 | 27.1 | 26.6 | 27.3 | 25.3 | 26.4 |
| 60° angle luster (%) | 34.3 | 34.0 | 35.1 | 35.0 | 34.7 | 34.5 |

COMPARATIVE EXAMPLE 6

A conductive polymer film was produced in the same manner as in Example 1 except that polypyrrole was used in place of polythiophene as a conductive polymer. Properties of the film obtained are shown in Table 3 below.

COMPARATIVE EXAMPLE 6

A conductive polymer film was produced in the same manner as in Example 1 except that polyaniline was used in place of polythiophene as a conductive polymer. Properties of the film obtained are shown in Table 3 below.

TABLE 3

|  | Comparative Example 6 | Comparative Example 7 |
|---|---|---|
| Film | TAC | TAC |
| Conductive polymer layer thickness (μm) | 0.10 | 0.10 |
| Surface resistivity (Ω/square) | $1 \times 10^5$ | $10^8$ |
| Total solar energy transmission (%) | 75 | 50 |
| Birefringence (nm) | 10 | 10 |

It should further be apparent to those skilled in the art that various changes in form and detail of the invention as shown and described above may be made. It is intended that such changes be included within the spirit and scope of the claims appended hereto.

What is claimed is:

1. A method of producing a protective film for a polarizing plate comprising a polymer film and a conductive polymer layer adhered to the surface thereof:
   comprising a step of:
   forming the conductive polymer layer with an aqueous coating liquid on the surface of the polymer film, wherein
   the polymer film comprises an acetyl cellulose material,
   the aqueous coating liquid contains polythiophene or polythiophene derivatives as a conductive polymer,
   the conductive polymer layer has a thickness of 3 μm or less,
   and the protective film has a visible light transmission of 78% or more and a surface resistivity of $10^3$-$10^{12}$ Ω/square.

2. The method of producing a protective film for a polarizing plate according to claim 1, wherein the aqueous coating liquid is prepared by adding a dopant in an amount of 0.1-500 parts by weight to 100 parts by weight of the conductive polymer that is polythiophene or polythiophene derivatives.

3. The method of producing a protective film for a polarizing plate according to claim 1, wherein the aqueous coating liquid contains a composition comprising 1-95% by weight of the conductive polymer and 5-99% by weight of a binder resin.

4. The method of producing a protective film for a polarizing plate according to claim 2, wherein the aqueous coating liquid contains a composition comprising 1-95% by weight of the conductive polymer and 5-99% by weight of a binder resin.

5. The method of producing a protective film for a polarizing plate according to claim 1, wherein a solid concentration of the aqueous coating liquid is 0.1-30% by weight.

6. The method of producing a protective film for a polarizing plate according to claim 1, wherein the aqueous coating liquid contains a water-soluble solvent.

7. The method of producing a protective film for a polarizing plate according to claim 1, a yellowness of the protective film is decreased rather than a yellowness of the polymer film comprising an acetyl cellulose material by the forming the conductive polymer layer on surface of the polymer film.

* * * * *